United States Patent
Barnea et al.

(10) Patent No.: US 7,310,511 B2
(45) Date of Patent: Dec. 18, 2007

(54) MONITORING AND MANAGEMENT OF ROAMING USERS

(75) Inventors: Alon Barnea, RaAnana (IL); Adi Paz, RaAnana (IL); Uri Zilberman, RaAnana (IL)

(73) Assignee: StarHome GmbH, Zurich (CH)

( * ) Notice: Subject to any disclaimer, the term of this patent is extended or adjusted under 35 U.S.C. 154(b) by 88 days.

(21) Appl. No.: 11/056,150

(22) Filed: Feb. 14, 2005

(65) Prior Publication Data

US 2005/0186939 A1    Aug. 25, 2005

Related U.S. Application Data

(60) Provisional application No. 60/543,910, filed on Feb. 13, 2004.

(51) Int. Cl.
*H04M 11/00* (2006.01)
*H04Q 7/20* (2006.01)

(52) U.S. Cl. ............... 455/408; 455/432.1; 379/114.01; 379/114.02; 379/114.28

(58) Field of Classification Search ............. 455/432.1, 455/432.2, 432.3, 408; 379/114.01, 114.02, 379/114.28, 126; 370/401
See application file for complete search history.

(56) References Cited

U.S. PATENT DOCUMENTS

| | | | |
|---|---|---|---|
| 5,610,973 A * | 3/1997 | Comer | 455/413 |
| 5,950,125 A * | 9/1999 | Buhrmann et al. | 455/432.1 |
| 6,226,364 B1 * | 5/2001 | O'Neil | 379/114.2 |
| 6,256,515 B1 * | 7/2001 | Cox et al. | 455/565 |
| 2002/0078167 A1 | 6/2002 | Shavit et al. | |
| 2002/0168960 A1 * | 11/2002 | Jacobson et al. | 455/410 |
| 2003/0072425 A1 * | 4/2003 | Hurst | 379/114.01 |
| 2004/0224680 A1 | 11/2004 | Jiang | |
| 2004/0235457 A1 * | 11/2004 | Florkey et al. | 455/414.1 |
| 2005/0070278 A1 | 3/2005 | Jiang | |
| 2005/0186950 A1 | 8/2005 | Jiang | |

FOREIGN PATENT DOCUMENTS

| | | |
|---|---|---|
| WO | WO 01/20920 | 3/2001 |
| WO | WO 2004/014101 | 2/2004 |
| WO | WO 2004/075484 | 2/2004 |
| WO | WO 2004/075579 | 2/2004 |
| WO | WO 2004/075598 | 2/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

* cited by examiner

*Primary Examiner*—William Trost
*Assistant Examiner*—Julio Perez (57) ABSTRACT

Roaming usage management apparatus for managing roaming mobile devices connected to roaming networks. The management apparatus includes a data gathering application for gathering roaming activity data, a database application, which aggregates the records into activity logs of calls per roaming device, and an output unit which sends outputs to or concerning respective roaming devices, in order to manage them based on activity levels or kinds of activity recorded in the logs. The embodiments thus provide management of roaming devices. The management is per roaming device, preferably real time, and may be used to leverage takeup of roaming services.

19 Claims, 10 Drawing Sheets

MONITORING AND MANAGEMENT OF ROAMING USERS

RELATIONSHIP TO EXISTING APPLICATIONS

The present application claims priority from U.S. Provisional Patent Application No. 60/543,910 filed Feb. 13, 2004, the contents of which are hereby incorporated by reference.

FIELD AND BACKGROUND OF THE INVENTION

The present invention relates to a method and apparatus for monitoring and management of roaming cellular telephony users, and, more particularly, but not exclusively to a method or apparatus that allows for such monitoring and management in real time.

Cellular telephone users generally have accounts with given networks provided by given network providers. The given networks do not have unlimited geographical coverage but are limited to specific counties or regions. Cellular telephones, being mobile, are not however limited to specific countries or regions as are the networks they belong to, and thus a system called roaming was developed to allow cellular telephones outside of the geographic region of their own, or home, network to connect to another compatible network. In the roaming system the mobile telephone connects to the available network as a roaming device.

The available network, hereinafter the roaming network logs the roaming device in if it is compatible but also makes a connection to the roaming device's home network to ensure that the device has the necessary authorization for international use and for call control and possibly other real time support. Typically the connection that is made to the home network comprises signaling, and is sent via a specific signaling connection. The SS7 signaling standard is typically used for such international signal between networks. connections for various purposes. In U.S. Patent Publication No. 2003/072425 a probe is used to monitor data on the SS7 International signaling lines. Probes which simply copy and store all passing data are well known, but the probe of the instant application goes a step further in that it associates different signals that belong to the same call and is able to set up a call detail report (CDR) for any individual call. The call detail reports may then be sent to the respective home network for statistical analysis etc.

It is noted that international telephony is a relatively profitable part of the service of a telephony provider and it is in the interest of the telephone companies to encourage such use. There currently exist systems which detect initial connections made by roaming devices to roaming networks and send to the user welcome messages in appropriate languages encouraging the user to take advantage of the roaming facilities. However, there is not currently any system that monitors anything beyond the initial connection of an individual roaming user, or of individual calls for the purpose of increase roaming usage.

There is thus a widely recognized need for, and it would be highly advantageous to have, a roaming monitoring and management system devoid of the above limitations.

SUMMARY OF THE INVENTION

According to one aspect of the present invention there is provided roaming usage management apparatus for roaming mobile devices connected to roaming networks, the roaming devices having respective home networks, the home and roaming networks being connected via a telephony connection, the apparatus comprising:

a data gathering application for gathering roaming activity data, a database application, associated with the data gathering application, for aggregating the gathered data into activity logs of calls per roaming device, and an output unit for sending output messages to respective roaming devices, based on activity levels recorded in the logs, thereby to provide management of the roaming devices.

Preferably, the database application further comprises logic for triggering the output unit to send respective output messages.

Preferably, the logic for triggering further comprises a usage analyzer for analyzing roaming usage to determine at least one of when to provide the triggering and which triggering to provide.

Preferably, the output messages are text messages sent to respective roaming devices.

Preferably, the output unit is configured to send a predetermined output when the activity log indicates lack of activity over a predetermined amount of time.

The apparatus may further comprise a statistical unit associated with the database for determining the predetermined amount of time based on statistical derivations from the database.

The apparatus may further comprise a statistical unit for calculating triggers for operating the output unit.

Preferably, the output unit is configured to send at least one of a selection of output messages, the selection being based on an activity level of an individual roamer.

Preferably, the data gathering application is configured to gather data from signaling on the connection.

Preferably, the signaling comprises SS7 signaling.

Preferably, the data gathering application is configured to gather data from call data records.

The apparatus may comprise a packet data warning unit associated with the database application for determining when a roaming device is connected without packet data services, and for triggering an output to the roaming device.

Preferably, there are a plurality of potential roaming networks available to a respective roaming device, at least one of the roaming networks being unable to make a data connection to a respective home network, the output unit being triggerable in the event of the roamer connecting to the unable roaming network, to send a warning to the roaming device.

According to a second preferred embodiment of the present invention there is provided a roaming usage management apparatus for roaming mobile devices connected to roaming networks, the roaming devices having respective home networks, and the roaming and home networks being connected by a telephony connection, the apparatus comprising:

a probe associated with the telephony connection, for monitoring signaling of the connection, and configured to aggregate signals of the connection into records of individual calls identifying a corresponding roaming device, a database associated with the probe, for aggregating the records into activity logs of calls per roaming device, and an output unit for sending output messages to respective roaming devices, based on activity levels recorded in the logs, thereby to provide management of the roaming devices.

Preferably, the output messages are text messages.

Preferably, the output unit is configured to send a predetermined output when the activity log indicates lack of activity over a predetermined amount of time.

The apparatus may comprise a statistical unit associated with the database for determining the predetermined amount of time based on statistical derivations from the database.

The apparatus may comprise a statistical unit for calculating triggers for operating the output unit.

Preferably, the output unit is configured to send one of a selection of output messages, the selection being based on an activity level of an individual roamer.

Preferably, the signaling comprises SS7 signaling.

According to a third aspect of the present invention there is provided a roaming usage management method for roaming mobile devices connected to roaming networks, the roaming devices having respective home networks, and the roaming and home networks being connected by a telephony connection carrying voice and signaling, the method comprising:

monitoring the signaling, aggregating the signaling into records of individual calls identifying a corresponding roaming device, aggregating the records into activity logs of calls per roaming device, and sending output messages to respective roaming devices, based on activity levels recorded in the logs, thereby to provide management of the roaming devices.

Preferably, the output messages are text messages.

The method may comprise sending a predetermined output when the activity log indicates lack of activity over a predetermined amount of time.

The method may comprise determining the predetermined amount of time based on statistical derivations from the database.

The method may comprise calculating triggers for operating the output unit based on statistical derivations from a database of the activity logs.

The method may comprise sending one of a selection of output messages, the selection being based on an activity level of an individual roamer.

Preferably, the signaling comprises SS7 signaling.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments comprise roaming usage management apparatus for managing roaming mobile devices connected to roaming networks. The management apparatus includes a data gathering application for gathering roaming activity data, a database application, which aggregates the records into activity logs of calls per roaming device, an application which contains the logic for analyzing the data and determining which output will be sent to the roamer and an output unit which sends outputs to or concerning respective roaming devices, in order to manage them based on activity levels or kinds of activity recorded in the logs. The embodiments thus provide management of roaming devices. The management is per roaming device and preferably real time. Preferably the aim of the per-roamer management is to leverage usage of roaming services.

The principles and operation of a roaming management apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
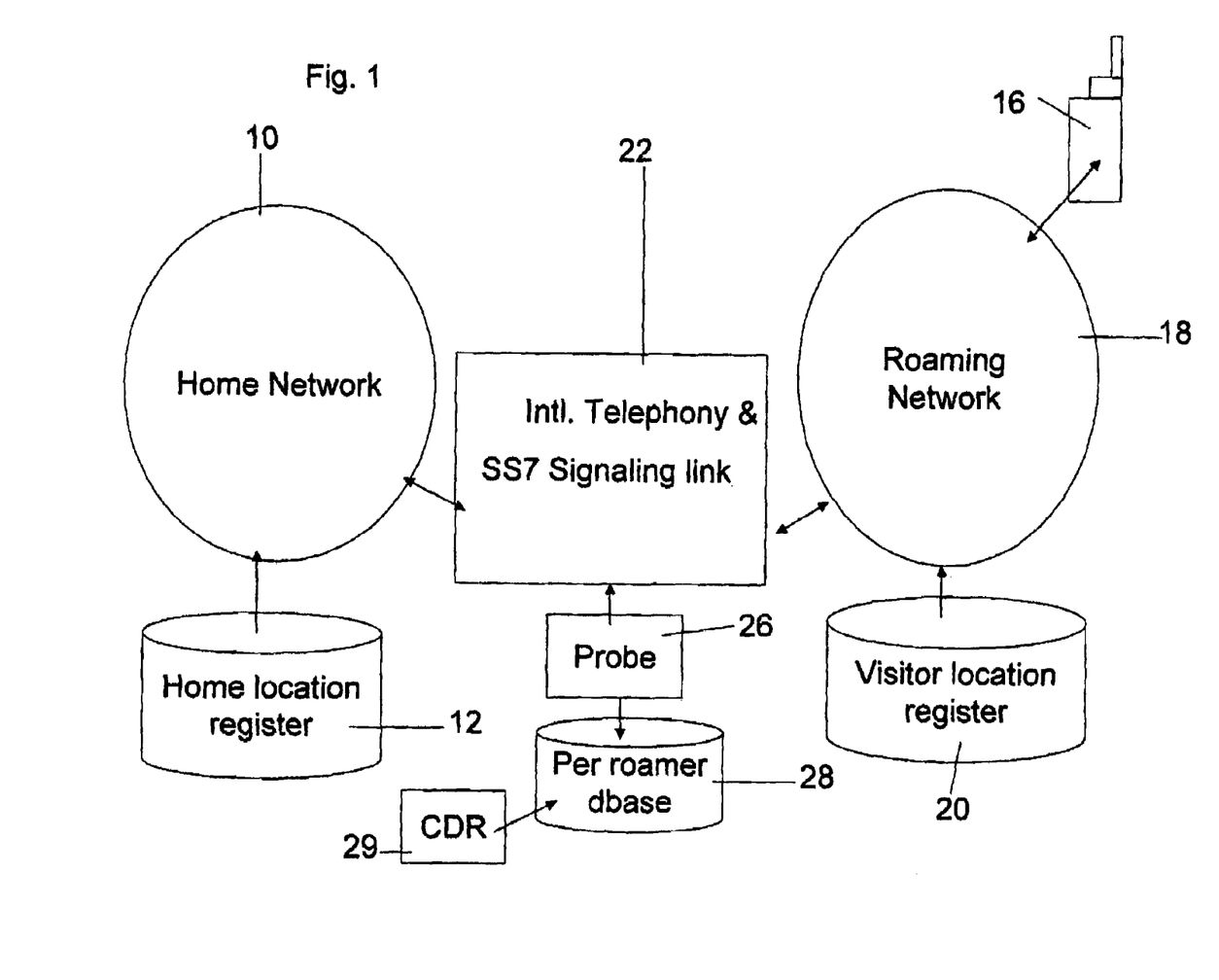
FIG. 1 is a simplified diagram showing a mobile device connected to a roaming network and being monitored by a management system according to a first preferred embodiment of the present invention.

Reference is now made to FIG. 1, which is a simplified block diagram illustrating a first preferred embodiment of the present invention. As shown in FIG. 1, there is a home mobile telephony network 10 in which a given mobile telephony device is subscribed. Subscribed devices are registered in a home location register 12. The home mobile telephony network 10 is generally geographically restricted to a country or region, and yet a cellular telephone is not so restricted. Mobile device 16 may stray from the geographical coverage of the home network 10. When the mobile device is outside of the reach of the home network it is designed to find any other compatible network 18 and connect through that network. The other network 18 is referred to as the roaming network and device 16, when connected to such a roaming network is referred to as a roaming device.

When device 16 attempts to connect to the roaming network, the roaming network registers the connection in visitor location register 20, which then sends an enquiry to the home location register 12 of the respective device to determine that the device 16 is authorized for roaming. A connection to the home network is also required to carry out billing.

The roaming network is connected to the home network. The connection is via International telephone lines 22 through which the telephone calls themselves are routed, and also through which signaling is sent via signaling links such as the SS7 International signaling system. The signaling supports initial registration of the device as a roaming device and also any other kinds of signaling needed to support telephony.

In the present embodiments the signaling is preferably monitored by probe 26. Probe 26 works together with a database and associated data aggregation application 28 which arranges signaling data per roaming telephone in order to produce a record that indicates how a particular telephone is used when roaming. As well as signaling, call data records CDR, 29 may be available. Call data records are records of individual telephone calls or connections. The application 28 includes a database, logic to add records to the database and additional logic to utilize the data from the database, as will be explained below.

The per telephone records that are produced may then be used in roaming service management. In one implementation the usage level recorded in the per-telephone records is used to send text messages with advertisements, reminders and offers in order to encourage a user to take advantage of the available roaming services.

Figure 2:
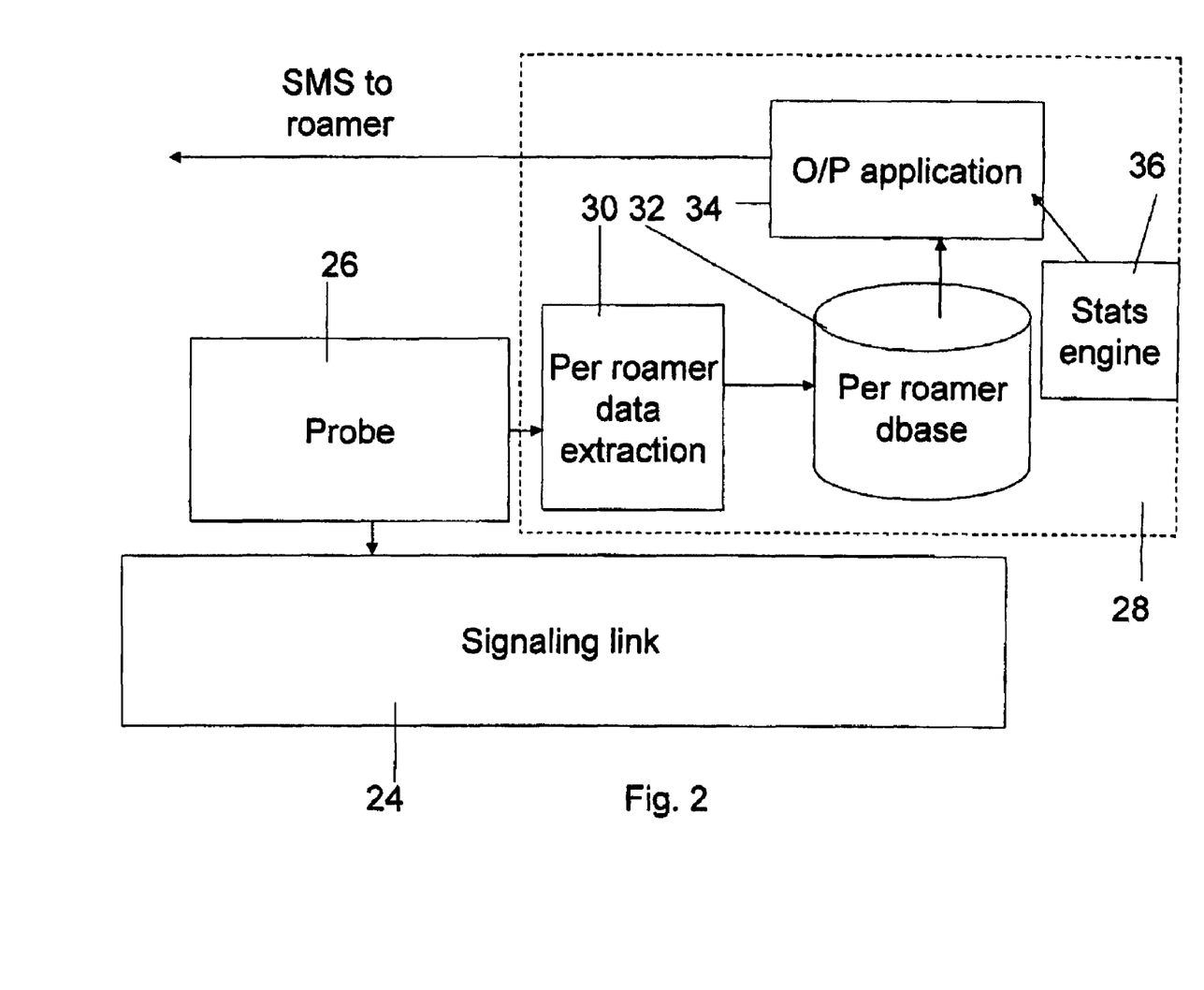
FIG. 2 is a simplified diagram illustrating in greater detail the management system shown in FIG. 1.

Reference is now made to FIG. 2, which is a simplified diagram illustrating the probe and database part of the embodiment of FIG. 1 in greater detail. Parts that are the same as in previous figures are given the same reference numerals and are not referred to again except as necessary for understanding the present embodiment. Database application 28 is shown to involve a data input application 30 which obtains data from the probe and arranges it per roaming device 18. Database 32 stores the data per roaming device in database records, and output application 34 makes use of the records in various ways to provide real time management of the roaming system. Real time management may involve sending text messages to the respective roaming device.

In one example the output application may send a certain text message when the record, say in the form of an activity log, indicates lack of activity over a certain amount of time. Likewise noticeably large amounts of activity may trigger different messages, and average amounts of activity may trigger yet further messages.

The different activity levels may be calculated statistically. The same trigger levels may be used throughout or different statistical levels may be used for specific connections. It is noted that in practice, average activity levels vary greatly between different countries, but also in accordance with different geographical locations within those countries. Thus average levels of activity will often be higher for major international commercial centers within countries than say for locations that are principally tourist destinations. Average usage levels also vary with times of the year. Database application 28 therefore is preferably supplied with a statistical calculation unit which dynamically calculates usage levels for different connections.

Figure 3:
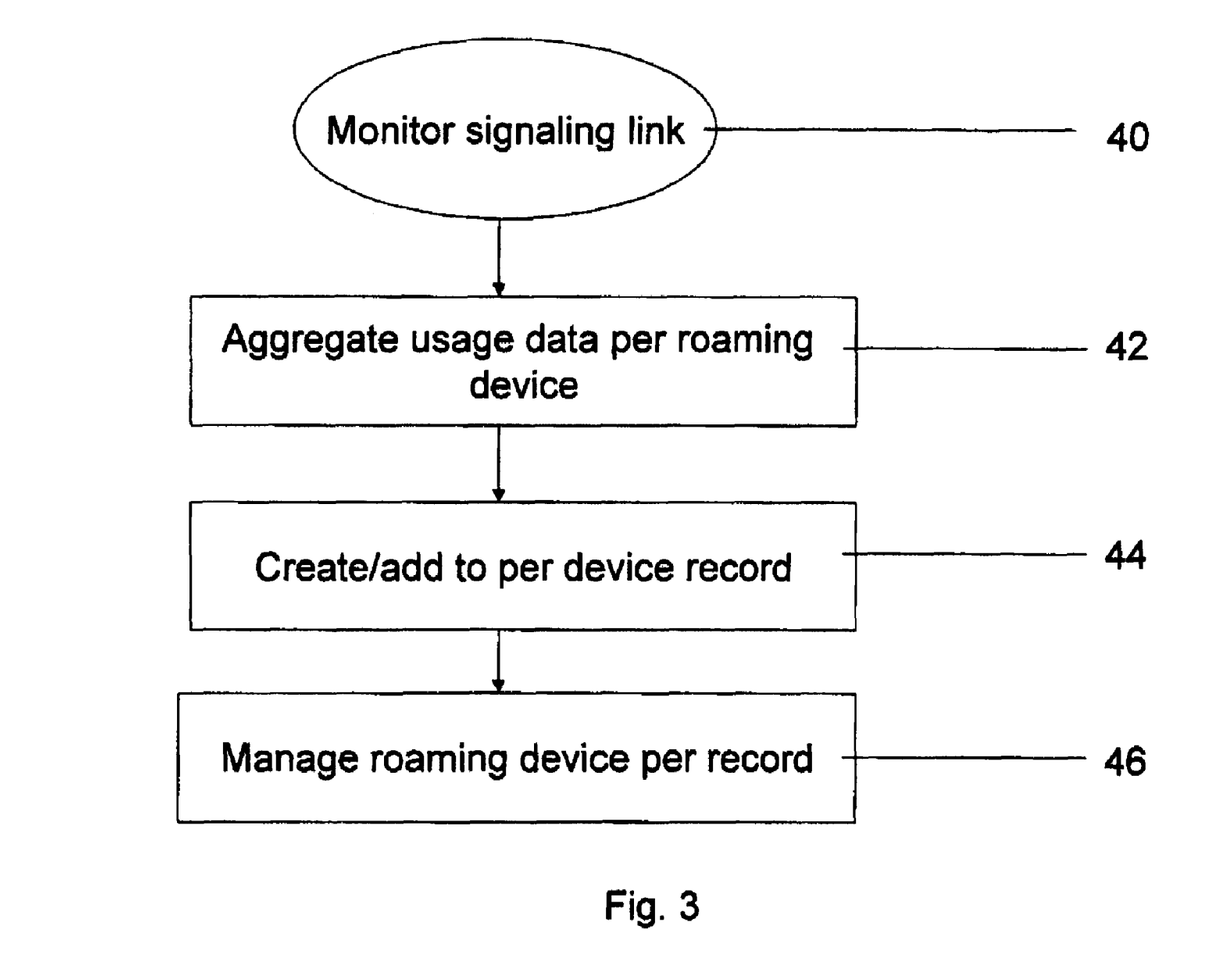
FIG. 3 is a simplified diagram illustrating a procedure for using the device of FIG. 1 or FIG. 2.

Reference is now made to FIG. 3, which is a simplified flow diagram illustrating a roaming usage management method for roaming mobile devices connected to roaming networks as above. The method comprises stage 40 of monitoring the SS7 signaling connection, a stage 42 of aggregating signals from the connection into records identifying a corresponding roaming device, and a stage 44 of managing the individual roaming devices using the records.

Figure 4:
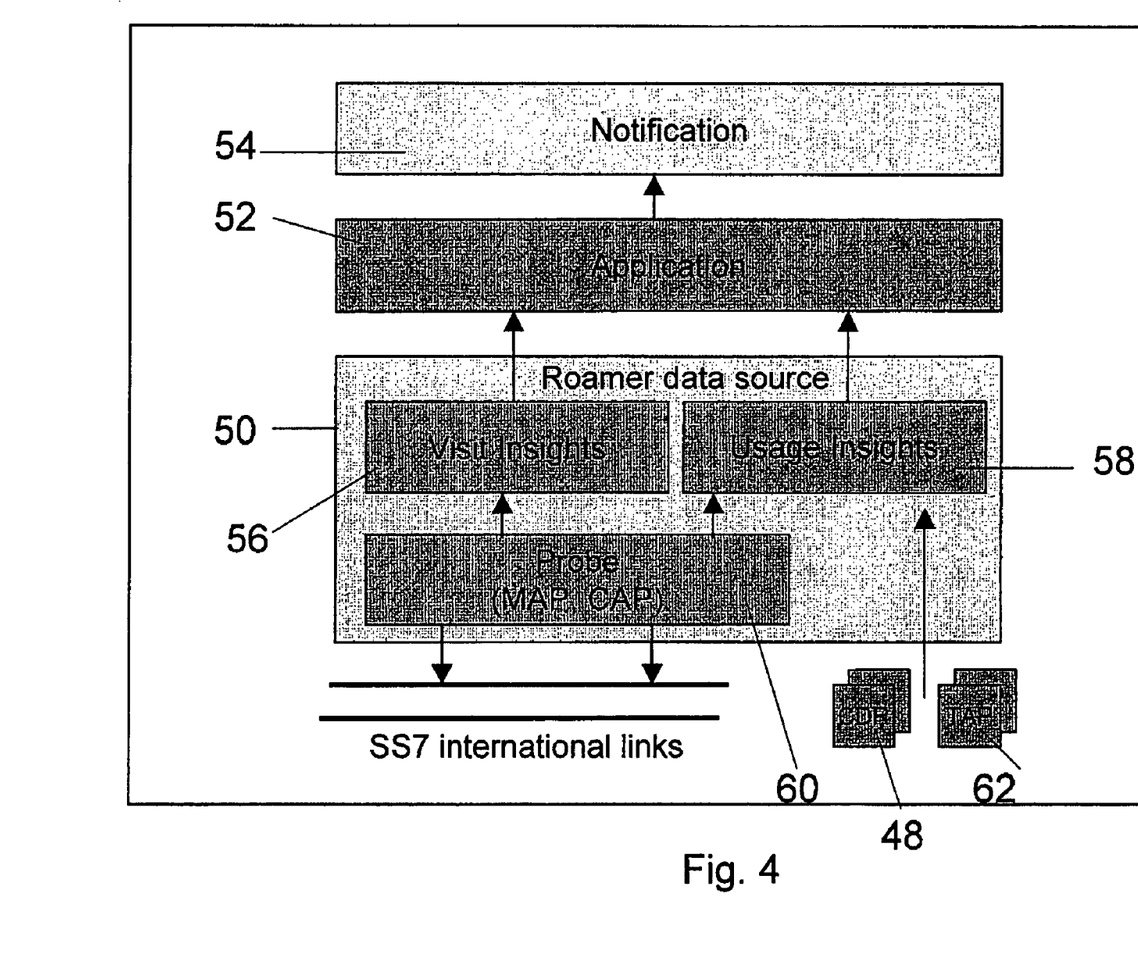
FIG. 4 is a simplified diagram illustrating a layer diagram of the device of FIG. 2.

Reference is now made to FIG. 4, which is a simplified block diagram illustrating the different layers of an application according to the present embodiments. The presence of a roaming device such as device 16 on a roaming network triggers signaling messages between the visitor location register (VLR) 20 and the home location register (HLR) 12. An initial Location Update MAP message to the HLR causes an Insert Subscriber Data (ISD) to be sent to the roaming VLR, and then the CAMEL system causes regular triggers to be sent from the visited to the home network, say for call control. All of these signals pass over the SS7 signaling lines so that a probe receives much information about what a roamer is doing.

Probe devices that watch international signaling lines are known from US Patent Application publication No. 2003/072425 assigned to Agilent. Such devices obtain considerable amounts of signaling data and according to Agilent's application, the signals are aggregated into call data records, (CDR) 48.

According to the present embodiments the data gathered by the individual data records are aggregated per roamer so that signals belonging to different calls are collected together in the database. The database of the present embodiments thus provides a real time indication of the way in which the individual roaming device is being used.

The output device of the present embodiments provides mobile operators with a messaging tool for a roaming community, whether inbound roamers (i.e., incoming visitors from external networks) or outbound roamers (i.e., the operator's own subscribers traveling abroad). The output device is designed to send targeted, personal and useful messages to roamers.

Referring again to FIG. 4 and the service involves different roamer data sources and several functional modules. The service is segmented into three functional layers, a probing and data source layer 50, an application layer 52 and a notification layer 54. Each layer is described in the sections below.

The notification layer 54 represents the messages delivery platforms with which the application interacts to send its messages. The platforms contain an interface layer to the SMSC or the MMSC, or the present applicant's proprietary notification engine, which resides in the present applicant's roaming support service platform known as IntelliGate.

The application layer 52 serves as the service core layer, which includes the different functional modules and the corresponding provisioning.

The Roamer data source layer 50 comprises two sets of data sources which feed the application: Visit attributes which are generated through a visit unit 56 by probing the international SS7 links to detect roamer arrivals/departures to/from mobile networks, and Usage attributes via a usage attribute unit 58, which analyzes the roamers' services usage behavior during a visit (e.g., voice calls generating, sending SMS etc.). The latter is derived from two substitutive sources 60 and 62 respectively, which are signaling probing and TAP analyzers.

The Data Source Layer 50

Figure 5:
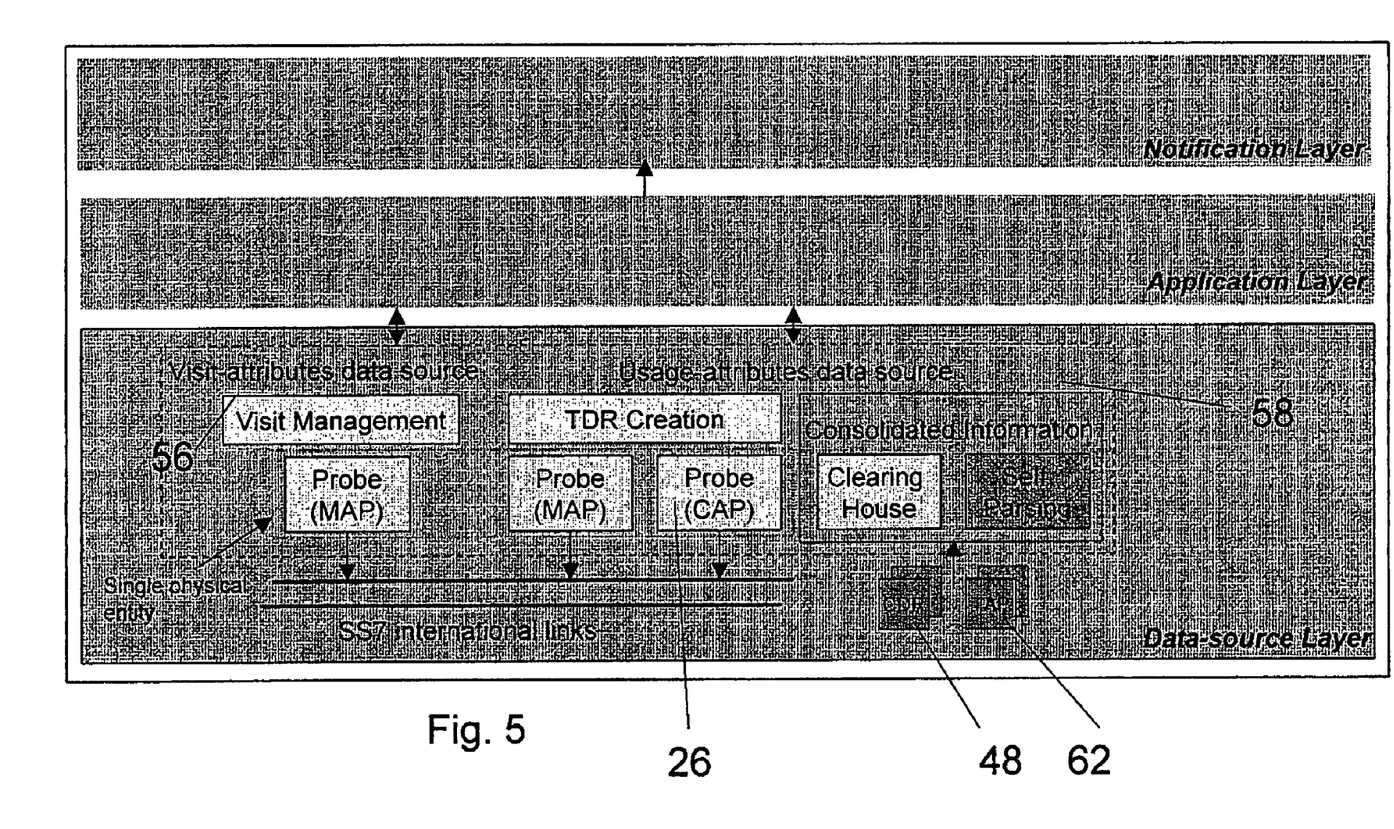
FIG. 5 is a simplified diagram illustrating a first layer of the device of FIG. 4.

Reference is now made to FIG. 5, which is a simplified diagram illustrating in greater detail the data source layer 50. Parts that are the same as in previous figures are given the same reference numerals and are not referred to again except as necessary for understanding the present embodiment. Layer 50 makes use of two datasource classes—Visit Attributes and Usage Attributes, as explained above.

The application is preferably aware of the current status of any given roamer before the output unit makes any attempt to initiate contact. For example, the roamer status may include identification of inbound roamers that just entered the network, or of outbound roamers that have recently registered on external networks, and roamers that have left the network. All of these indications are referred to as the roamer visit-attributes.

In addition, the service may include functional modules which tailor personal usage-based content for the roaming subscriber. Usage-based attributes are generated by actual probing or by analysis of CDR's 48 and TAP files 62. These details are referred to as roamer usage-attributes.

The following two sections describe the attributes of the two classes of roamer data sources.

Visit-Attribute Data Source

A visit's attributes may include information as explained above. Using the network terminology this information may include:

MSISDN/IMSI of roamers arrive at the operator's network (inbound)
MSISDN/IMSI of roamers arrive at the external operator's network (outbound)
MSISDN/IMSI of roamers that leave the network (inbound and outbound)
Home network of the inbound roamers (HPMNs)
Roamer's location in the visited network (MSC resolution as first phase)

This information is derived from probe device 26 that constantly monitors MAP messages over the operator's international signaling links. The raw probe information is assessed in the Visit Management module that translates the probe raw data into meaningful visit attributes.

Usage-Attribute Data Source

The output unit, which carries out roaming unit management action, requires actual roamer's usage attributes such as voice calls, SMS's sent, and data sessions that have been established during a visit. Otherwise it does not know when to take management action or what action to take.

The usage-based information is derived form two main sources:
Probing insights
CDR and TAP analysis
Probing Insights The Starhome mobility probe is used to generate usage insights. Note that the three instances of the probe 26 in FIG. 4 represent logical utilities only—all are actually provided from a single physical probe. The probe information is derived both from MAP and CAP messages.

CAP—call analysis of CAMEL users, which mainly represent the prepaid community
MAP—used mainly for roaming registration and for completing SMS information when not derived from CAP probing CDR and TAP analysis CDR and TAP represent the maximal information level on the roamer's activity in the network. The information can be generated from one of the following two sources:

Clearing house—TAP information can be derived from the operator's clearing house.
CDR self parsing—CDR's can be parsed to generate roamer usage attributes.

The skilled person will appreciate that the above two sources are basically substitutable. The actual sources used will be selected according to the operator's preference.

Layer II: Application

Figure 6:
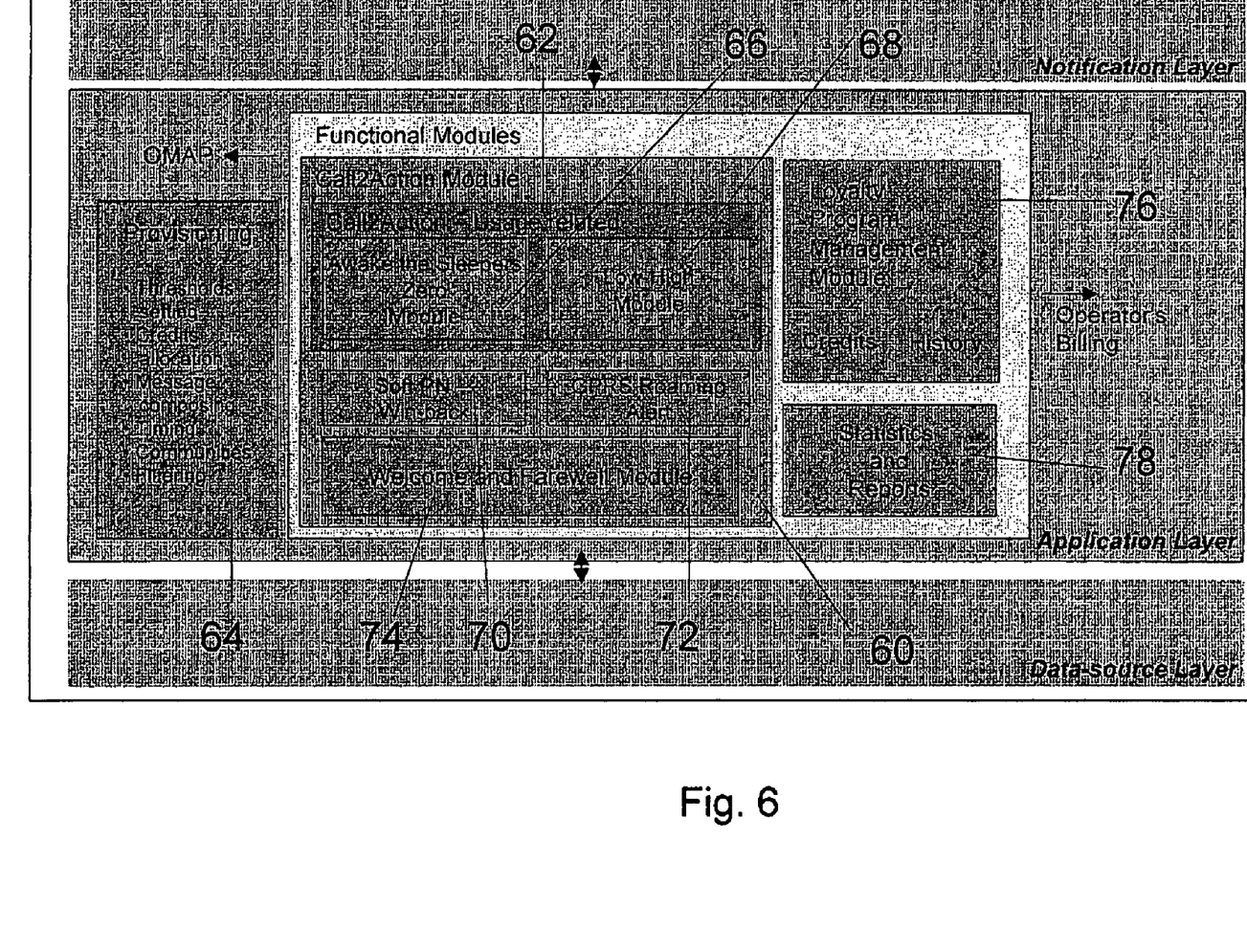
FIG. 6 is a simplified diagram illustrating a second layer of the device of FIG. 4.

Reference is now made to FIG. 6, which is a simplified block diagram illustrating the application layer 52 of FIG. 4.

The application layer 52 comprises functional modules as shown in FIG. 6. These modules may be implemented in phases, as different modules may be relevant to different operators.

A Call to action module 60 is responsible for service functionality that results in sending a message. The message objective is to evoke roamer awareness to motivate an activity that is in the interest of the operator.

The Call to Action module comprises several sub-modules.

A Call2Action—Usage related module 62 represents two sets of complimentary services that are based on the roamer's actual service consumption behavior during the visit. Both services are based on the usage-attributes derived from the underlying Data-source layer referred to above with respect to FIG. 5.

Usage Definition

The usage-related module utilizes information on the roamers' actual services usage while roaming in order to generate a tailored, effective, message content.

Usage is a broad term that may include several attributes for each MSISDN/IMSI such as:

Total number of voice calls during the visit
Average number of voice calls in a certain period (e.g., weekend)
Duration of voice calls during visit
Duration of voice within a certain period
Total duration of local calls
Total duration of overseas calls
Total duration of calls to home country
Number of times Short Code was dialed
Number of Data calls
Total duration of Data calls (CSD)
Average duration of Data calls over a certain period.

Provisioning module 64 preferably allows the operator to define its desired usage parameters and the threshold for each. Provisioning is perceived as one of the key modules of the product. The provisioning module works using parameters, and a preferred parameter list and the required activity for each parameter are discussed as follows.

Usage parameters

Thresholds allocation—the provisioner may set the threshold levels for the selected usage parameters that will trigger the wake-up calls.

Timing module—The provisioner may set the timing scheme by which messages will be sent.

Credits allocation rules—set the credits types and the allocation rules for the Loyalty and Rewards module.

Target groups allocation (communities)—the provisioner may set different groups to which targeted messages will be sent (e.g., prepaid community business users) and define their user lists. Community provisioning (i.e., subscribers MSISDN/IMSIs and their community allocation) can be derived for example by FTP from the operator or by predefined IMSI range that the probe may detect and deliver to the application.

Number of messages—set maximal number of messages that are allowed to be sent to a roamer to avoid spamming.

Message content setting—SMS and MMS message composition.

Filtering—Set filtering criteria such as black lists and white lists of operators and subscribers to which messages are not allowed to be sent.

Languages—set the language that fits the inbound and outbound services, classified by HPMNs (inbound) and VPMNs (outbound).

User Groups

The roaming community can be classified by its service usage patterns (e.g., voice call generation, SMS-sending, etc.) into four main categories:

"Zero-usage" group: Roamers that do not generate any actions (e.g., voice call, SMS, or MMS) during the visit "Low-usage" group: Roamers that generate a low number of actions during the visit.

"Medium-usage" group: Roamers that generate a medium number of actions during the visit.

"High-usage" group: Roamers that generate a high number of actions during the visit.

Classification into one of these groups may be determined by roamer behavior during the first few hours or days of the visit, and this is a feature that may be configured at will by an operator using the provisioning module 64.

Awake the Sleepers "Zero" Module

An Awake the Sleepers module 66 is focused on the "Zero-usage" group and generates a wake-up message to those roamers with zero usage. The wake-up message may for example include either:

A basic reminder—such as content (e.g., mentioning the call tariffs, assuming the roamer did not generate a call due to perceived high prices of calls), or An advanced reminder—message that includes an embedded benefit to motivate the roamer to begin using operator services (e.g., discounts on call tariffs for the upcoming x hours). A list of optional incentives is provided in the Loyalty Program Management Module (Section 0).

The Awake the Sleepers module 66 is a push-nature module where the list of subscribers to which the message should be sent is derived from the data sources delivered/requested (push/pull) by the Data-source layer of FIG. 4.

Awake the Sleepers "Low-High" Module

Low-High module 68 is focused on the low-, medium-, and high-usage groups. The goal is to strengthen services in low use amongst active roamers, such as roamers that do not generate enough calls during specific certain time periods (e.g., day time, night time, weekends) and roamers that do not generate enough calls to specific destinations (local calls, calls to their HPMNs).

Message may be sent to these roamers to entice usage of the services in low use by offering embedded incentives.

Low-High module 68 has a push nature in which the candidates are identified by the system, which triggers a message to be sent to them.

Soft Preferred Network—Win-Back Module

Win-back module 70 provides the operator with a set of two complimentary services:

Win-back for Outbound: Network operators can convince their outbound subscribers to roam within specific networks by sending a "win-back" message whenever they register on a non-recommended network.

Win-back for Inbound: A win-back message is sent to inbound roamers, who initially registered on a given network but switched (either by manual selection or because of a more powerful signal strength) to a competitor's network, in order to lure back these inbound roamers.

The application makes use of the visit-attributes derived from the underlying Data-source layer, which provide the required information for the roamer such as:

MSISDN/IMSI

Currently visited network

A trigger when the roamer is leaves the network

The roamer's new location (network)

The application preferably decides whether a message should be triggered (i.e., the roamer has switched to another network in the same country), compose the message content, and send the message to the notification layer. The application should ignore instances in which the roamer has indeed left the network but has also left the country, in which case there is of course no chance of winning him back.

The operator is preferably able to provision the service and select the networks to which the message is allowed to be sent, compose different contents for different networks, define the time interval after which the message should be sent, etc.

GPRS Roaming Alert Module

GPRS Roaming Alert module 72 preferably provides an important help information service for roaming subscribers that have failed to receive GPRS connection abroad, for example in order to receive Internet and data type services.

In the currently available GSM flow, a user can register on a foreign hosting GSM network that has a GPRS infrastructure. However, despite the hosting network established GSM roaming agreement with the subscriber's home network, a separate GPRS roaming agreement is also required and is not necessarily available. When the user wishes to activate a data service (e.g., send MMS), the GPRS connection will fail and a message to this effect will appear on the handset display. To activate the GPRS connection, the roamer must manually switch over to a competing network in the country that does have the necessary GPRS roaming agreement.

Most roamers are not able to correlate between the failed message and the necessity to switch over to another VPMN. Roamers will simply give up their attempt to activate data services, which results in lost income for the visited and home operators.

The GPRS Roaming Alert module therefore triggers an automated message to the user in the scenario of successful voice connection but unsuccessful data connection. More particularly, the GPRS alert is sent to users who register successfully on a roaming network which does not have a GPRS roaming agreement with the home network (i.e. where GPRS will not work). and provides a list of networks in that country which do have a GPRS roaming agreement with the applicable home network.

In a preferred embodiment the message provides an option for the user to request that he is transferred to another network that is more suitable. Upon receiving an affirmative request, the user's current connection can be rejected from the home network or at an intermediate system, causing the mobile device to search for another network.

In another preferred embodiment the user's current connection may be rejected as the action of the output device, without sending the user a message. The user then reconnects to a network that supports the necessary GPRS activity.

Methods of transferring a user from one network to another are disclosed in applicant's co-pending U.S. patent application Ser. No. 10/806,281, filed Mar. 23, 2004, the contents of which are hereby incorporated as if fully set forth herein.

By analyzing network connection information, the Data-source module detects that a user is connected to a network for which data connections will not be possible. The information, which includes the network on which the user is currently attempting a data connection, is delivered to the application layer, which preferably triggers the message. The list of valid roaming partners may be updated by the operator via the provisioning module.

Welcome and Farewell Module

Welcome and Farewell module 74 represents a basic traditional welcome service. The module is focused at the visit's starting time (i.e., a roamer just arrived on the hosting network, whether inbound or outbound) and provides him with a hello-context message.

The trigger for sending a Welcome or a Farewell message is derived from MAP probing in the underlying Data-source layer. The Data-source layer detects the Location Update message when a roamer registers in a new network (whether inbound or outbound) and also detects the Cancel message, which indicates that the roamer's has left the network. The Data-source layer also provides the subscriber's home network and currently visited network. These attributes may be used by the application to trigger a Welcome or Farewell message to the subscriber.

In certain cases the user may have connected to a network that is not preferred from the point of view of his home provider. In such a case the user may be sent a message asking him to agree to be transferred to a more suitable network. Upon agreement the user is then transferred, as described above.

Loyalty Program Management Module

Whereas the Call2Action Module is a push-nature service, Loyalty Program Management module 76 is a pull service. The service may require user registration. Registration can be done in two modes:

Web registration—usually prior to the subscriber leaving the home network.

Instant registration—The loyalty and rewards service can be promoted by the basic welcome message sent to the roamer right after entering the visited network. By replying to the welcome SMS message, the user could register for a rewards and loyalty program, which module 76 is now able to manage.

Service Concept

The Loyalty Program Management module is based on a similar concept to common loyalty clubs (e.g., airlines' frequent flyers):

When a roamer is using services while abroad (e.g., generating voice calls), a credit is allocated. Increased service usage results in more credits.

Credits can be redeemed in different forms, such as:

Roaming tariffs discount during the current visit

Air time credit the roamer can use on the home network after returning home from abroad Coupons for local tourists attractions $3^{rd}$-party loyalty clubs credits Operator's gift-shop credit The operator is preferably able to control the options offered to subscribers, and the subscriber should be able to choose from the available options.

$3^{rd}$ Party Loyalty Clubs

For $3^{rd}$-party loyalty programs, the application should extract and transfer points via standard interfaces such as FTP, http, and email.

History Handling

The Loyalty and Rewards module involves using the history-of-credits records to allow the subscriber to gather credits derived from several visits.

Service Flow

Figure 7:
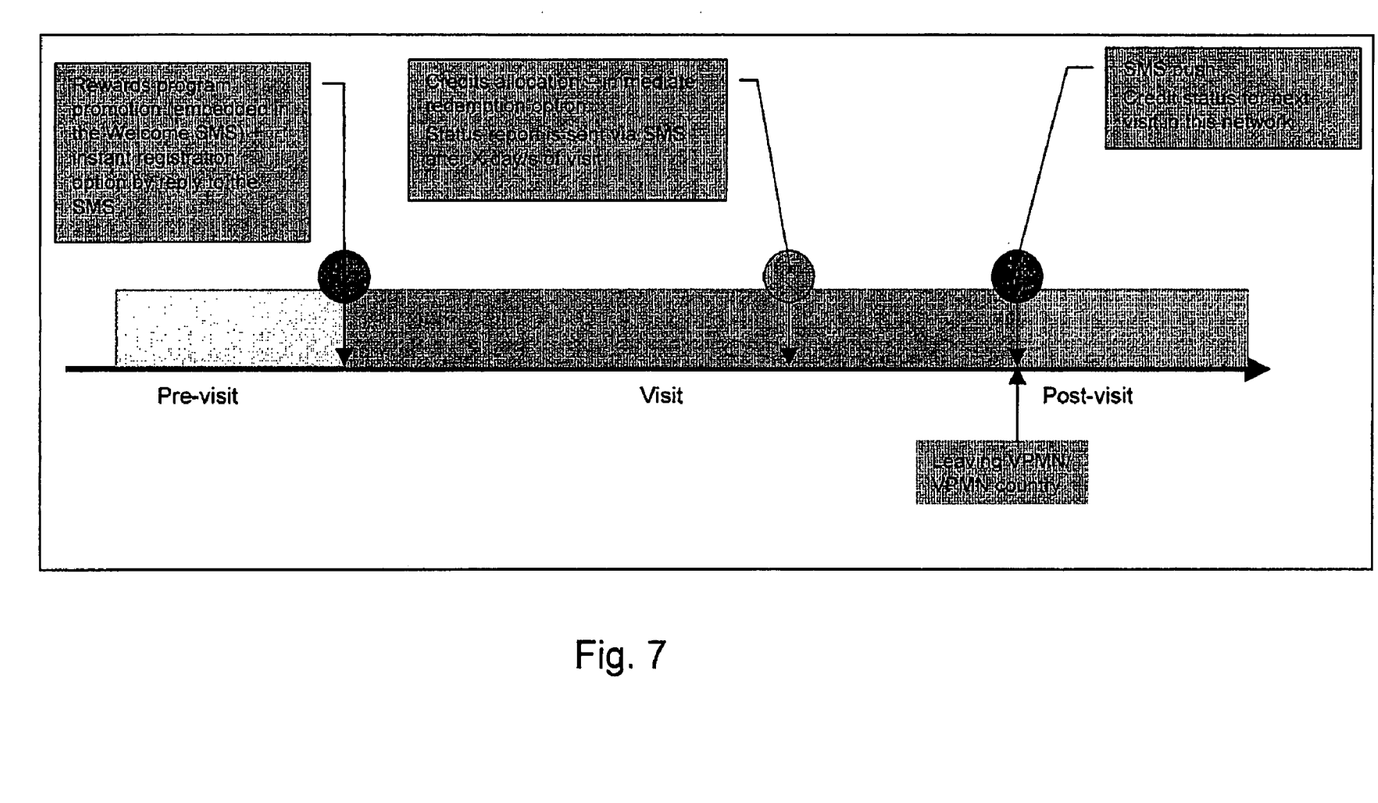
FIGS. 7 and 8 illustrate two possible scenarios for operation of the promotion module of FIG. 6.
Figure 8:
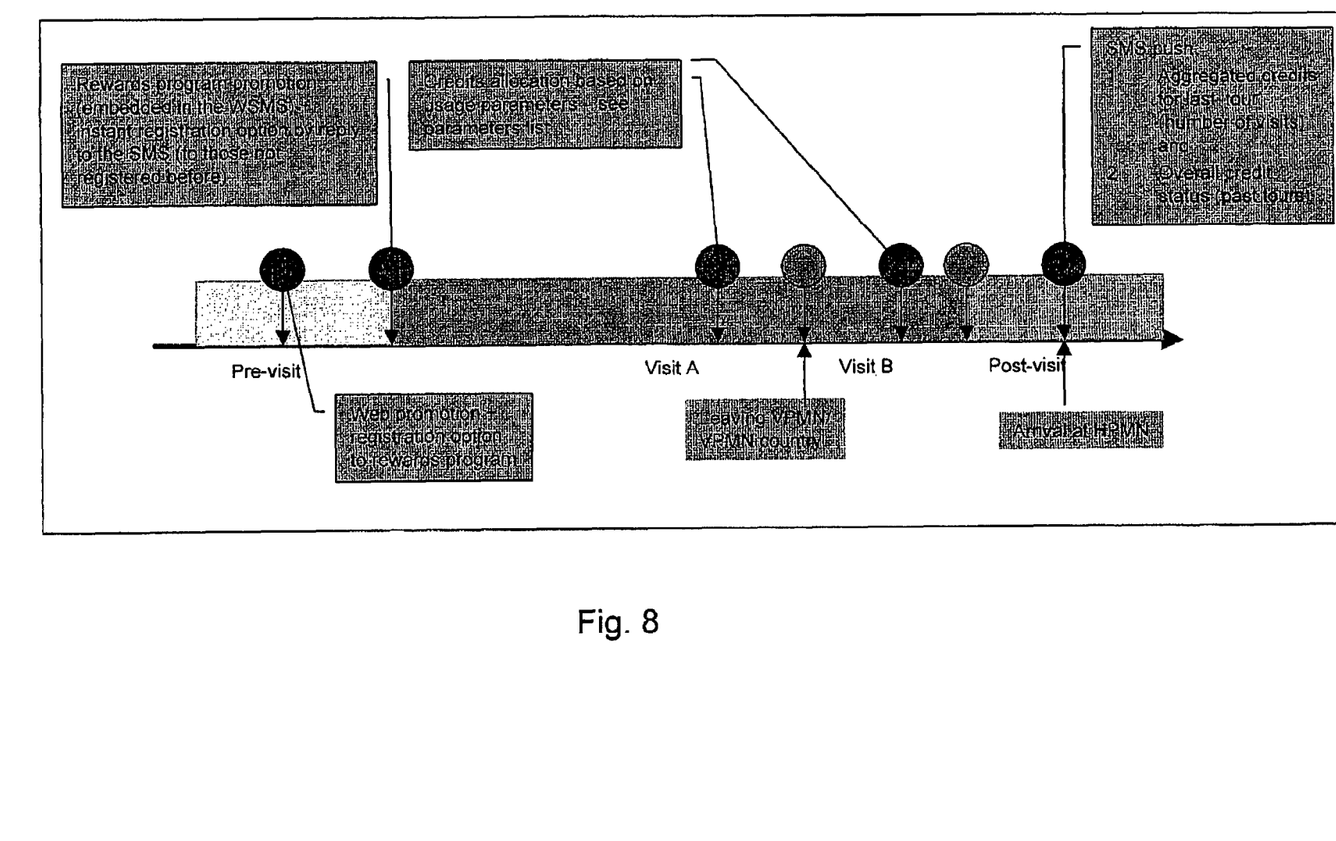

Reference is now made to FIGS. 7 and 8, which demonstrate a preferred service flow for the Loyalty and Rewards module. Red circles indicate a triggered message.

FIG. 7 illustrates a scenario for an inbound roamer, that is a roamer arriving at the current network, and FIG. 8 illustrates a scenario for an outbound roamer.

In both scenarios, the user registers for the service. Registration may be carried out in advance, say via the Internet or over the telephone. Alternatively the user may be invited to join by replying to a text message sent to him at the time. In the case of the outbound roamer the message may be sent at the user's first attempt to log in as a roamer. In the case of the inbound roamer the message will typically be sent on the first attempt of the user to log in to the current roaming network. During the course of connection the user gains reward points and uses them and may be sent updates of the current state of his account. The reward rate may be changed depending on the level of his usage or on other factors as desired by the operator and then at the end of the process the user is given a summary of his state, and preferably also details of how he can use up any remaining points.

Common Attributes

The following describes a set of attributes which are common to all modules.

Several basic attributes are required for all functional modules.

Languages sensitive messaging—The message language should be location sensitive, meaning:

Inbound service—Language should at least match the VPMN language.

Outbound service—Language should at least match the HPMN language.

The roamer's current hosting network is provided by the Data-source layer.

Two-way interaction—The service should support two-way SMS interaction with the subscriber (e.g., registering for the Loyalty program by replying to the welcome message initially sent to promoting the program).

Messages formats—Messages formal should be viable in SMS and MMS.

Messaging timing mechanism—Time-set mechanism should be applied when configuring messages flow, e.g.:

Absolute time—The absolute time (date and hour) at which each message should be sent.

Relative time—Set the time frame between sequential messages.

Triggered events—For example, a welcome message triggered by the Location Update identification (provided by the mobility probe in the Data-source layer)

The timing mechanism should be possible for individual messages as well as for group messages, such as in the Community Groups module. Sending a mass of messages may have implications on performance and a queuing mechanism may be required.

Validity period—Defines a time frame after which a message that has not been sent (e.g., SMSC overload, application overload) is deleted from the queue. This is used for modules that are time sensitive, e.g., a happy-hour promotion that an operator would like to send his outbound roamers. For example the operator may be aware that tourists can easily be encouraged to use the early evening to make calls home using simple promotions. Messages that have not been sent by the time the happy hour ends obviously should not be sent.

Communities—The Community Groups module is designed to provide customized message content to distinct and discernible groups of people who share common interests or goals, such as the prepaid community, business users, teenagers, or any other target group the operator can classify by MSISDNs/IMSIs. All common messages attributes described above should be able to be assigned to a community (e.g., language sensitive, timing scheme, message composing, etc.).

Filtering—These include operators, individual subscribers, or MSC numbers to which messages are not allowed to be sent.

Statistics and Reports Module

Statistics and reports module 76 is provided to assess and analyze performance and monitor the effectiveness of promotions.

The Statistics and Reports module preferably provides the operators with a set of embedded reports that suit the different functional modules. These reports are used for three main purposes:

1. Service configuration launch: Used for an effective design of service parameters and threshold settings—mainly used for the Call2Action—Usage related module. The Datasource layer provides the raw information required for the reports.

Examples include:
Average roamer visit period
Average roamer number of calls within a visit
Calls distribution by time (day/night; working days/weekend)

2. On-going service operation: Used to show statistics of actual service behavior. Examples include:
Actual messages sent, segmented by:
Functional module
VPMNs
HPMNs
Success/failures
Communities
Credits allocation status segmented by subscribers 3. Post action analysis: Used to analyze the success of services. Examples include:
Usage incensement factor as a result to the wake up messages.

The module preferably supports inherent reports as described above and also permits the extraction of raw reports on individual calls, say for the mobile operator's own data needs.

Figure 9:
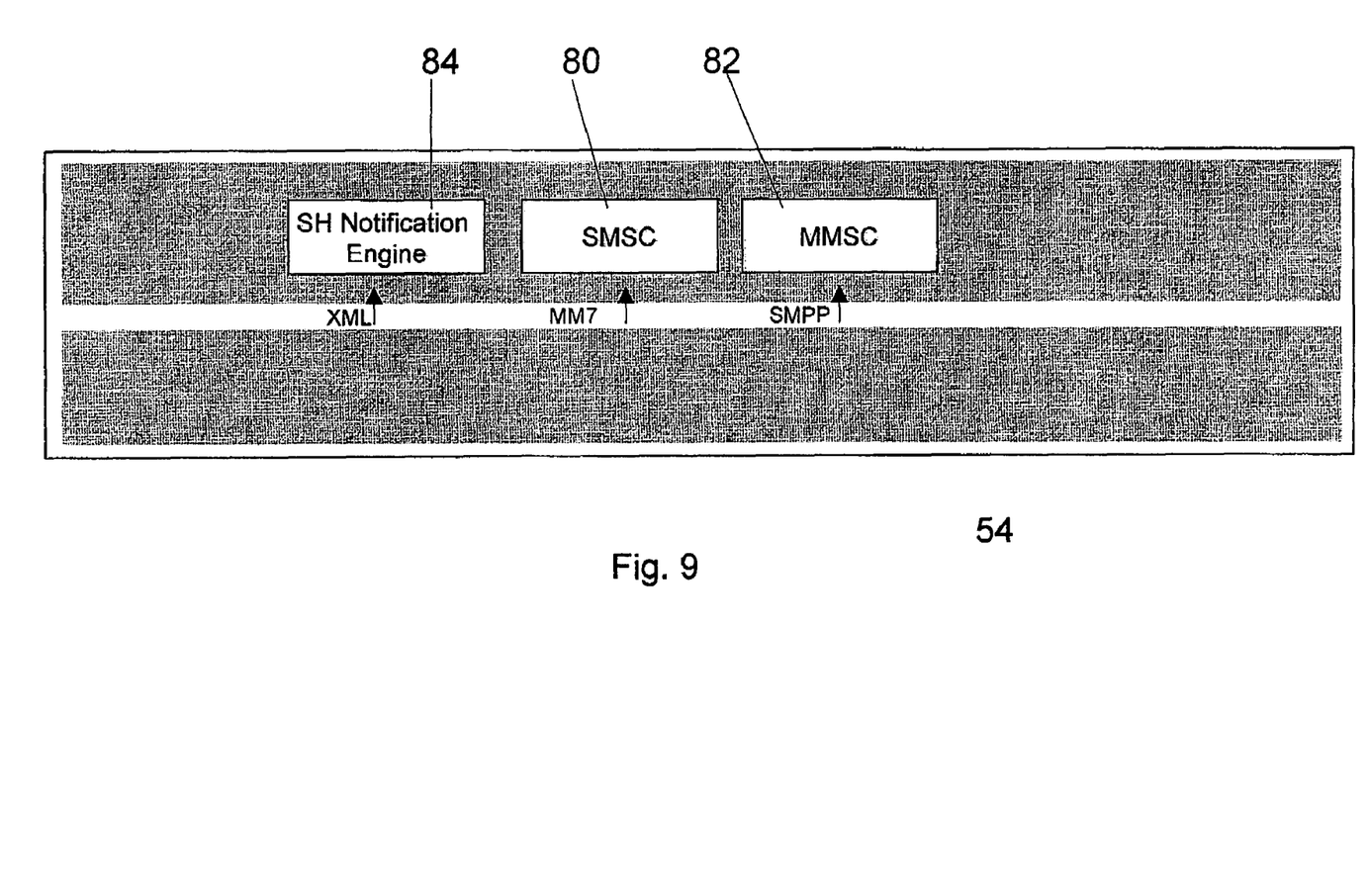
FIG. 9 is a simplified diagram illustrating a third layer of the device of FIG. 4.

Reference is now made to FIG. 9, which comprises the notification layer 54, that being the message delivery layer to which the application sends output messages to the roaming devices, or to other locations as appropriate. The notification layer includes an SMSC interface module 80 which uses standard protocols, such as SMPP; UCP, and CIMD2. An MMS interface module 82 uses a standard MM7 interface, with compliance with 3GPP standard (TS 23.240).

A notification engine 84 is preferably provided as appropriate.

Figure 10:
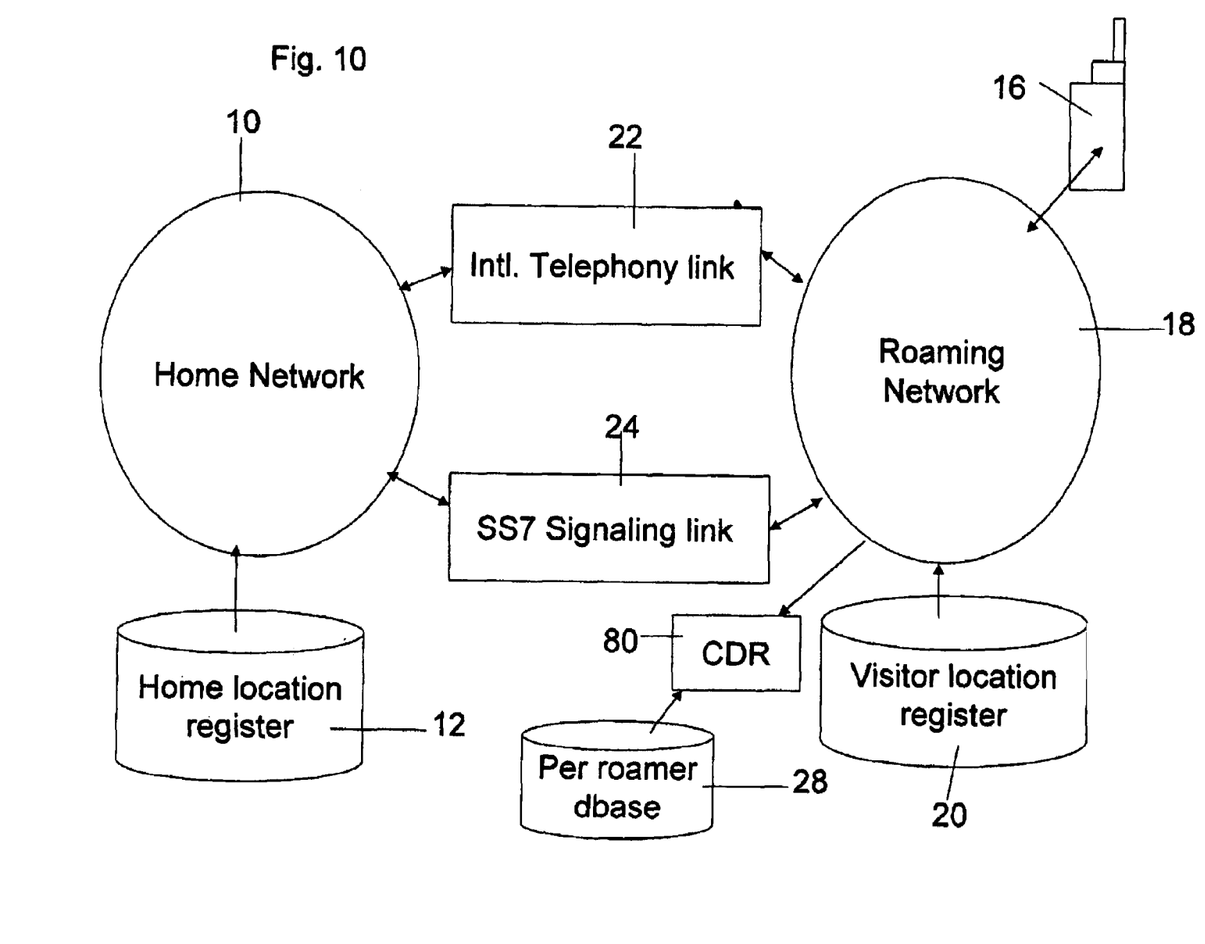
FIG. 10 is a simplified diagram illustrating a second preferred embodiment of a roaming device management system according to the present invention.

Reference is now made to FIG. 10 which is a simplified diagram illustrating an alternative embodiment of the present invention, in which data for the database application is not obtained from a probe placed on the International signaling connections. Parts that are the same as in previous figures are given the same reference numerals and are not referred to again except as necessary for understanding the present embodiment. In FIG. 10, data for the database application is obtained from call data records CDR, 80 which are single records of individual calls or connections. The CDRs may be made by the roaming network, the home network or over the intervening signal connections, and the database application 78 simply extracts data therefrom and builds records based on individual roaming devices. Over a period of time the records built up by the application show behavior of the individual roaming devices, allowing them to be managed as per the previous embodiments.

In accordance with the above embodiments, monitoring of roaming traffic is used to create records per individual roaming device, and the results are used to manage the individual roamers. An aim of such management is to leverage use of the available roaming services.

It is expected that during the life of this patent many relevant probing and notification devices and systems will be developed and the scope of the corresponding terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Roaming usage management apparatus for roaming mobile devices connected to roaming networks, said roaming devices having respective home networks, said home and roaming networks being connected via a telephony connection, the apparatus comprising:
   a data gathering application for gathering roaming activity data pertaining to the roaming mobile devices,
   a database application, associated with said data gathering application, for aggregating said gathered data into activity logs of calls per roaming mobile device, and
   an output unit for sending at least one output message to a respective one of said roaming devices, based on activity levels recorded in said logs for said roaming mobile device, thereby to provide management of said roaming mobile devices wherein said output unit is configured to send a predetermined output when said activity log indicates lack of activity over a predetermined amount of time.

2. Roaming usage management apparatus according to claim 1, wherein said database application further comprises logic for triggering said output unit to send respective output messages.

3. Roaming usage management apparatus according to claim 1, wherein said logic for triggering further comprises a usage analyzer for analyzing roaming usage to determine at least one of when to provide said triggering and which triggering to provide.

4. Roaming usage management apparatus according to claim 1, wherein said output messages are text messages sent to respective roaming devices.

5. Roaming usage management apparatus according to claim 1, further comprising a statistical unit associated with said database for determining said predetermined amount of time based on statistical derivations from said database.

6. Roaming usage management apparatus according to claim 1, further comprising:
   a statistical unit for calculating triggers for operating said output unit.

7. Roaming usage management apparatus according to claim 1, wherein said output unit is configured to send at least one of a selection of output messages, said selection being based on an activity level of an individual roamer.

8. Roaming usage management apparatus according to claim 1, wherein said data gathering application is configured to gather data from signaling on said connection.

9. Roaming usage management apparatus according to claim 8, wherein said signaling comprises SS7 signaling.

10. Roaming usage management apparatus according to claim 1, wherein said data gathering application is configured to gather data from call data records.

11. Roaming usage management apparatus according to claim 1, further comprising a packet data warning unit associated with said database application for determining when a roaming device is connected without packet data services, and for triggering an output to said roaming device.

12. Roaming usage management apparatus according to claim 1, wherein there are a plurality of potential roaming networks available to a respective roaming device, at least one of said roaming networks being unable to make a data connection to a respective home network, said output unit being triggerable in the event of said roamer connecting to said unable roaming network, to send a warning to said roaming device.

13. Roaming usage management apparatus according to claim 1, comprising:
   a probe associated with said telephony connection, for monitoring signaling of said connection, and configured to aggregate signals of said connection into records of individual calls identifying a corresponding roaming mobile device,
   wherein the database application is associated with said probe, for aggregating said records into activity logs of calls per roaming mobile device, and
   wherein said output unit is adapted for sending at least one output message to a respective mobile roaming device, based on activity levels recorded in said logs for said roaming mobile device, thereby to provide management of said roaming devices.

14. Roaming usage management method for roaming mobile devices connected to roaming networks, said roaming devices having respective home networks, and the roaming and home networks being connected by a telephony connection carrying voice and signaling, the method comprising:
   monitoring said signaling,
   aggregating said signaling into records of individual calls identifying a corresponding roaming mobile device,
   aggregating said records into activity logs of calls per roaming mobile device, sending at least one output message to a respective roaming mobile device, based on activity levels recorded in said logs for said roaming mobile device, thereby to provide management of said roaming devices and
   sending a predetermined output when said activity log indicates lack of activity over a predetermined amount of time.

15. Roaming usage management method according to claim 14, wherein said output messages are text messages.

16. Roaming usage management method according to claim 14, further comprising determining said predetermined amount of time based on statistical derivations from said database.

17. Roaming usage management method according to claim 14, wherein said sending comprises
   sending at least one output message to a respective roaming mobile device, based on activity levels recorded in said logs for said roaming mobile device, thereby to provide management of said roaming devices and further comprising:
   calculating triggers for operating said output unit based on statistical derivations from a database of said activity logs.

18. Roaming usage management method according to claim 14, comprising sending one of a selection of output messages, said selection being based on an activity level of an individual roamer.

19. Roaming usage management method according to claim 14, wherein said signaling comprises SS7 signaling.

* * * * *